United States Patent [19]

Yamazaki

[11] Patent Number: 4,850,234

[45] Date of Patent: Jul. 25, 1989

[54] AUXILIARY DRIVE APPARATUS

[75] Inventor: Masanobu Yamazaki, Kosai, Japan

[73] Assignee: Fujikiko Kabushiki Kaisha, Tokyo, Japan

[21] Appl. No.: 166,349

[22] Filed: Mar. 10, 1988

[30] Foreign Application Priority Data

Mar. 10, 1987 [JP] Japan ................... 62-53181
Mar. 18, 1987 [JP] Japan ................... 62-61052
Mar. 27, 1987 [JP] Japan ................... 62-71892
Sep. 21, 1987 [JP] Japan ................... 62-234972

[51] Int. Cl.$^4$ ................. F16H 15/50; F16H 17/06; F16D 3/76

[52] U.S. Cl. ................... 74/15.2; 74/15.4; 74/15.63; 74/190.5; 74/574; 74/752 B; 74/796; 464/89; 464/180; 474/902

[58] Field of Search ........... 74/15.2, 15.4, 15.63, 74/190.5, 574, 752 B, 796; 464/89, 180; 474/902

[56] References Cited

U.S. PATENT DOCUMENTS

| 705,209 | 7/1902 | Crane | 74/796 |
|---|---|---|---|
| 1,175,677 | 3/1919 | Barnes | 74/190.5 |
| 1,847,553 | 3/1932 | De Pew | 74/190.5 X |
| 2,101,844 | 12/1937 | Fraser | 74/796 |
| 2,861,472 | 11/1958 | Hansz | 74/574 |
| 2,977,819 | 4/1961 | Haushalter | 74/574 |
| 3,596,524 | 8/1971 | Cook | 74/15.4 |
| 4,710,152 | 12/1987 | Ichikawa et al. | 74/574 X |

FOREIGN PATENT DOCUMENTS

| 100369 | 7/1925 | Austria . | |
| 220871 | 5/1987 | European Pat. Off. | 74/574 |
| 2918379 | 11/1979 | Fed. Rep. of Germany . | |
| 345514 | 3/1960 | Switzerland . | |
| 961674 | 6/1964 | United Kingdom | 74/15.63 |
| 2035481 | 6/1980 | United Kingdom . | |

Primary Examiner—Allan D. Herrmann
Attorney, Agent, or Firm—Foley & Lardner, Schwartz, Jeffery, Schwaab, Mack, Blumenthal & Evans

[57] ABSTRACT

A speed reduction mechanism comprises a drive member rotated by a rotary drive force of a drive source; a fixed member opposing to the drive member; a rotor disposed between the drive member and the fixed member and contacting the drive member and the fixed member and rotated around itself by the rotation of the drive member and revoluted around a rotary central portion of the drive member; and a speed reduction rotary member for rotatably supporting the rotor and rotated around the rotary central portion of the drive member by the revolution of the rotor.

An auxiliary drive apparatus of an internal combustion engine comprises a stepless speed change mechanism disposed in a power transmission system from a crankshaft of the internal combustion engine to a pulley for driving the auxiliary drive apparatus, the stepless speed change mechanism steplessly changing the rotational speed of the crankshaft and transmitting the rotation of the crankshaft to the pulley; and a mass for restricting the oscillation of the crankshaft through an elastic member, the mass being disposed in a crankshaft system of the auxiliary drive apparatus.

The auxiliary drive apparatus of an internal combustion engine further comprises a second pulley different from the pulley and disposed in a crankshaft system of the auxiliary drive apparatus and driving the auxiliary drive apparatus.

28 Claims, 12 Drawing Sheets

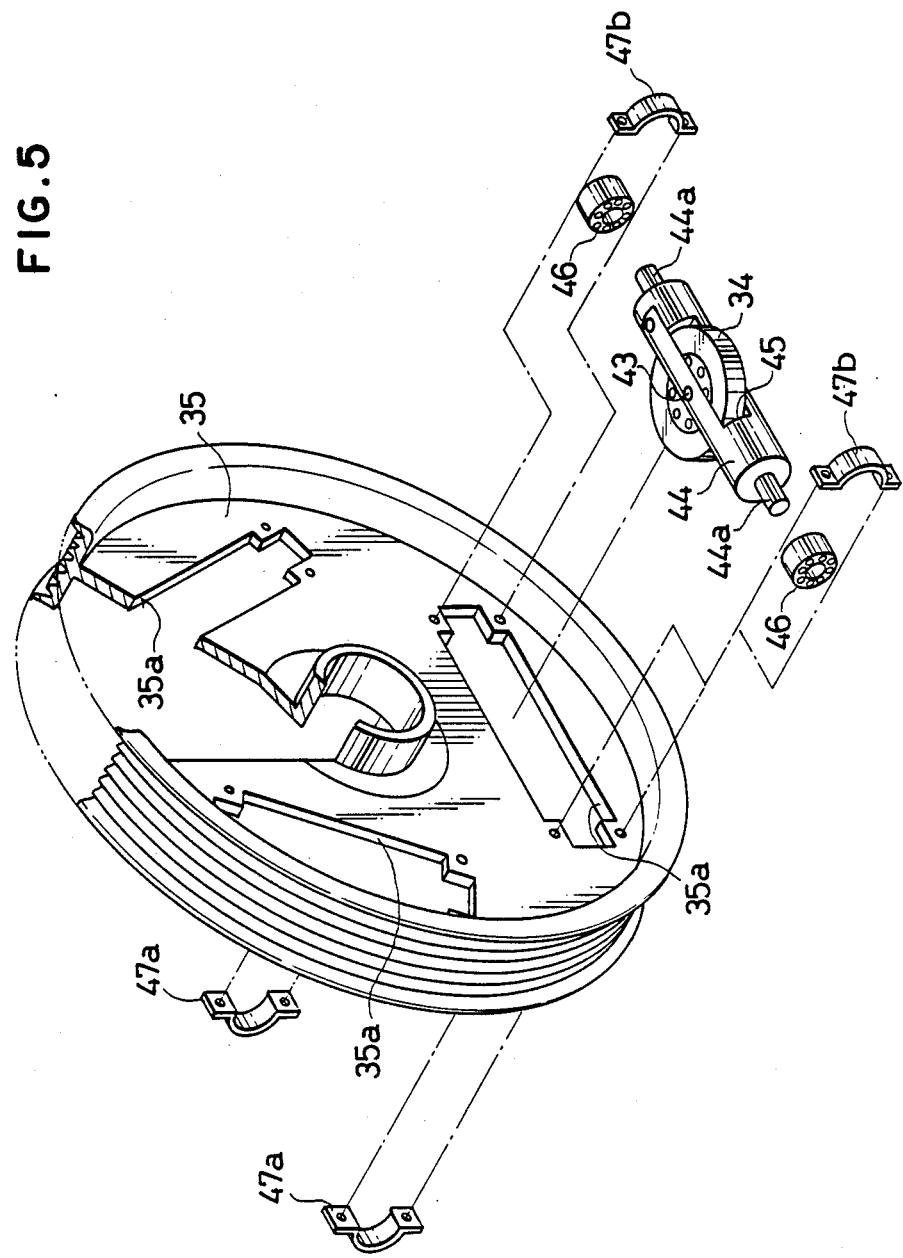

AUXILIARY DRIVE APPARATUS

The present invention relates to an auxiliary drive apparatus in an internal combustion engine for example, such as a speed reduction mechanism for reducing the rotation of a drive source utilizing a rotor to transmit the reduced rotation to a driven source.

BACKGROUND OF THE INVENTION

Conventionally, a belt transmitting mechanism has been used as a means for reducing the rotational speed of a crank shaft of an internal combustion engine as a drive source and transmitting the reduced rotation to an auxiliary apparatus such as a water pump or cooling compressor as a driven source. Such a belt transmitting mechanism is composed of a drive pulley having a small diameter, a driven pulley having a large diameter, and a belt wound around these pulleys. The rotation of the crank shaft is reduced from the drive pulley through the belt to the driven pulley, and is transmitted to the auxiliary apparatus.

However, recently, the internal combustion engine has been provided with a supercharger to obtain a high output so that it is sometimes necessary to rotate the crankshaft at a speed higher than the one in the conventional apparatus. In this case, the rotation of the crankshaft is transmitted to an auxiliary apparatus without sufficiently reducing the high speed rotation of the crankshaft by a conventional belt transmitting mechanism. Therefore, the auxiliary apparatus is rotated at a high speed higher than a predetermined speed so that high heat is generated in frictional elements in the auxiliary apparatus, thereby damaging the auxiliary apparatus.

It is possible to greatly reduce the rotational speed of the crankshaft and transmit the rotation thereof by increasing the pulley ratio of the belt transmitting mechanism. To increase the pulley ratio, it is necessary to reduce the diameter of the drive pulley since it is not possible to increase the size of the driven pulley in an engine room having a small space to be utilized. However, the belt wound around the drive pulley has a limited radius of curvature so that the drive pulley cannot be set to have a diameter less than a predetermined diameter, and the speed reduction by the belt transmitting mechanism is limited.

Further, the auxiliary apparatus is excessively rotated at a high speed by the internal combustion engine through the crankshaft, thereby increasing the fuel cost.

When the rotational speed of the internal combustion engine is greatly reduced to transmit the rotational force thereof to the auxiliary apparatus, although the auxiliary apparatus is desirably rotated at a rotational speed higher than a predetermined rotational speed at the low rotational speed of the internal combustion engine, the rotational speed of the auxiliary apparatus is greatly reduced and the auxiliary apparatus is rotated at a rotational speed less than the predetermined rotational speed. Accordingly, it is not possible to sufficiently fulfill the function of the auxiliary apparatus.

In another conventional auxiliary drive apparatus of an internal combustion engine, the rotational speed of the crankshaft of the internal combustion engine is steplessly changed by a stepless speed change mechanism, and the rotation thereof is transmitted to a pulley for driving the auxiliary apparatus.

However, in such an internal combustion engine, a massive auxiliary apparatus is attached to the crankshaft in place of a single pulley having a small mass so that the tortional oscillation of the crankshaft tends to be amplified.

In such an auxiliary apparatus of the internal combustion engine, there is no means for reducing the tortional oscillation of the crankshaft so that a noise due to the tortional oscillation is generated and the crankshaft might be damaged by the fatigue thereof in some cases, and a crank bolt for attaching the auxiliary drive apparatus to the crankshaft might be untightened.

In a conventional automobile for example, it is not necessary to rotate an auxiliary apparatus such as a power pump, air compressor, alternator, etc., at a speed higher than a predetermined speed. Further in some cases, it is preferable that the auxiliary apparatus is not rotated at a speed higher than the predetermined speed even when the number of rotations of the internal combustion engine is increased. Accordingly, recently the rotational force of the internal combustion engine has tended to be transmitted to the auxiliary apparatus through an automatic speed change device.

However, it is important from the view point of the engine cooling that a water pump among respective auxiliary apparatuses is rotated in proportion to the increase of the number of rotations of the internal combustion engine. However, in such a conventional apparatus, two rotary forces different in nature from each other cannot be obtained from a single speed change device so that it is necessary to dispose another means transmitting the rotary force and directly connected to a rotary shaft of the internal combustion engine in addition to the speed change device.

Accordingly, the size of the auxiliary drive apparatus is increased, and the structure thereof is complicated.

SUMMARY OF THE INVENTION

To solve such problems mentioned above, an object of the present invention is to provide an auxiliary drive apparatus in which no high heat is generated in frictional elements of the auxiliary drive apparatus, thereby improving the auxiliary apparatus.

Another object of the present invention is to provide a compact auxiliary drive apparatus.

Another object of the present invention is to provide an auxiliary drive apparatus for absorbing a slight change of the rotary drive force thereof.

Another object of the present invention is to provide an auxiliary drive apparatus for transmitting the rotation of a drive means such as an internal combustion engine to a driven source with the reduction ratio changed.

Another object of the present invention is to provide an auxiliary drive apparatus for reducing fuel cost in an internal combustion engine.

Another object of the present invention is to provide an auxiliary drive apparatus for reducing a tortional oscillation of a crankshaft in an internal combustion engine.

Another object of the present invention is to provide an auxiliary drive apparatus for providing two rotary forces different in nature from each other by a single auxiliary drive unit.

Another object of the present invention is to provide an auxiliary drive apparatus having a simplified structure.

With above objects in view, the present invention resides in a speed reduction mechanism comprising a drive member rotated by a rotary drive force of a drive source; a fixed member opposing to the drive member; rotor means disposed between the drive member and the fixed member and contacting the drive member and the fixed member and rotated around itself by the rotation of the dive member and revoluted around a rotary central portion of the drive member; and a speed reduction rotary member for rotatably supporting the rotor means and rotated around the rotary central portion of the drive member by the revolution of the rotor means.

In another embodiment, the present invention resides in an auxiliary drive apparatus of an internal combustion engine comprising a stepless speed change mechanism disposed in a power transmission system from a crankshaft of the internal combustion engine to pulley means for driving the auxiliary drive apparatus, said stepless speed change mechanism steplessly changing the rotational speed of the crankshaft and transmitting the rotation of the crankshaft to the pulley means; and mass means for restricting the oscillation of the crankshaft through elastic means, said mass means being disposed in a crankshaft system of the auxiliary drive apparatus.

In another embodiment of the present invention, the auxiliary drive apparatus of an internal combustion engine further comprises a second pulley means different from the pulley means and disposed in a crankshaft system of the auxiliary drive apparatus and driving the auxiliary drive apparatus.

BRIEF DESCRIPTION OF THE DRAWINGS

The present invention will be more apparent from the following description of the preferred embodiments thereof in conjunction with the accompanying drawings in which:

FIG. 5 is an exploded perspective view of the rotary holder disposed in a speed reduction rotary member;

DETAILED DESCRIPTION OF THE PREFERRED EMBODIMENTS

The preferred embodiments of the present invention will now be described in detail with reference to the accompanying drawings.

Figure 1:
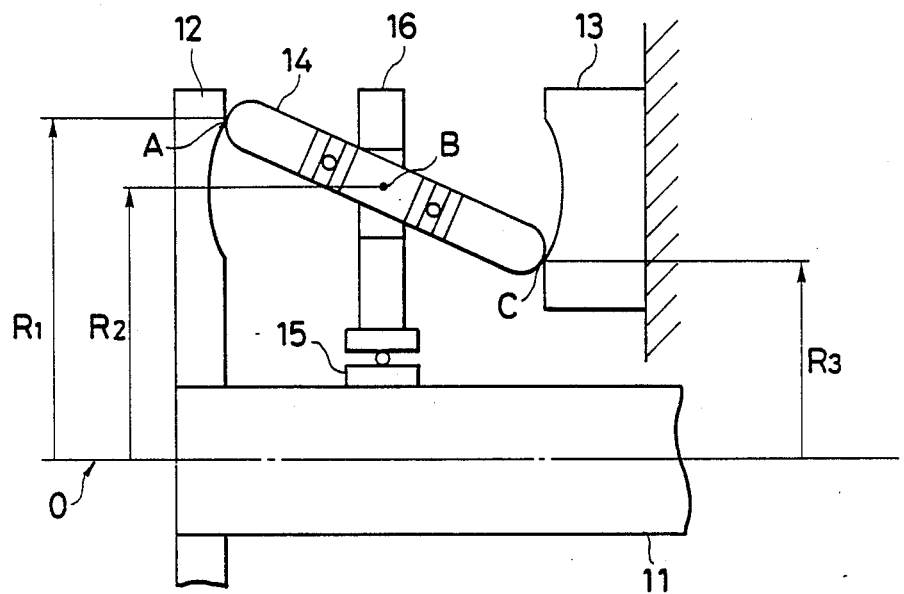
FIG. 1 is a schematic view for explaining a mechanism for reducing the rotational speed of a reduction gear.
Figure 2:
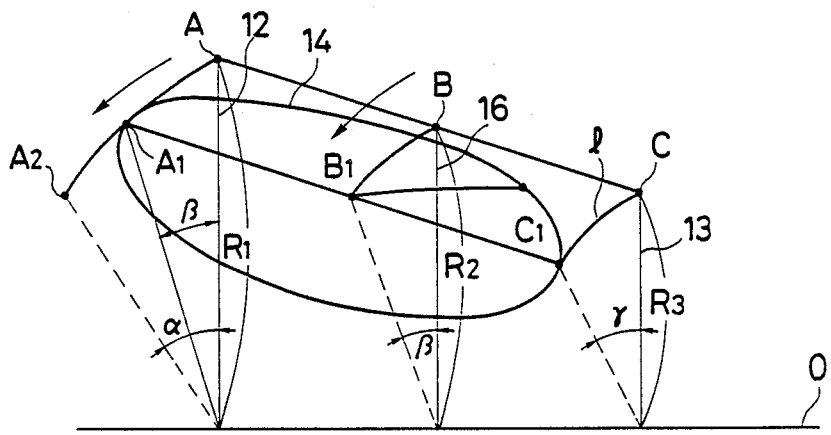
FIG. 2 is a view for explaining the action of the speed reduction mechanism of FIG. 1.

FIGS. 1 and 2 show a speed reduction mechanism in accordance with one embodiment of the present invention.

In FIG. 1, a generally disc-shaped drive plate or drive member 12 is fixed to an end of a drive shaft 11 as a drive source such as a crankshaft of an internal combustion engine. A fixed plate or fixed member 13 is opposite the drive plate 12. Fixed member 13 is fixed relative to drive shaft 11 and is fitted around drive shaft 11. A rotor 14 as a frictional wheel is disposed between the drive plate 12 and the fixed plate 13, and frictionally contacts them. The rotor 14 is rotatably and oscillationally attached to a speed reduction rotary plate or rotary member 16 disposed between the drive plate 12 and the fixed plate 13 and rotatably supported by the drive shaft 11 through a bearing 15.

In such a structure, when the rotor 14 contacts the drive plate 12 at point A and contacts the fixed plate 13 at point C, the rotor 14 can be rotated around a rotary central portion or point B so that the positions of points A and C can be changed. Namely, the distance $R_1$ from the central line O of the drive shaft 11 to point A, and the distance $R_3$ from the central line O to contact point C can be changed where the distance between the central line O to point B is designated by $R_2$.

When the drive plate 12 is rotated by the rotary drive force of the drive shaft 11, the rotor 14 is rotated around point B thereof and is simultaneously revoluted around the central line O since the rotor 14 contacts the rotating drive plate 12 and the resting fixed plate 13. The speed reduction rotary member 16 is rotated around the central line O by the revolution of the rotor 14 around the central line O.

The operation of the apparatus of the present invention will be described in detail with reference to FIG. 2 showing the schematic construction of FIG. 1. In FIG. 2, the same constructive portions as those of FIG. 1 are designated by the same reference numerals. When the drive plate 12 is rotated by angle $\alpha$, point A is moved to point $A_2$. At this time, the speed reduction rotary member 16 is rotated by angle $\beta$ smaller than angle $\alpha$, and point B is moved to point $B_1$, and contact point C is also moved to contact point $C_1$, where the angle between contact points C and $C_1$ is designated by $\gamma$.

With respect to the fixed plate 13, when contact point C is moved to contact point $C_1$, the rotor 14 is rotated around point B by length l where $l = R_3 \times \gamma$ --- (1). The fixed plate 13 is in a resting state, and the speed reduction rotary member 16 is rotated by angle $\beta$, so that $\gamma = \beta$ is formed. Accordingly, equation (1) is changed to the following equation $l = R_3 \times \beta$ --- (2). Here, we assume that a point corresponding to angle $\beta$ is $A_1$ in a locus from point A to point $A_2$. The drive plate 12 is further rotated by length 1 from angle $\beta$ of the speed reduction rotary member 16 so that $A_1A_2=1$. Here, length $1=(\dot{\alpha}-\dot{\beta})\times R_1$ --- (3). By substituting equation (2) to equation (3), $\alpha+(R_3/R_1)\beta$ is formed, thereby providing $\beta=(1+(R_3/R_1))^{-1}\times\alpha$.

When $R_3=R_1$, $\beta=\alpha/2$ so that the rotation of the drive plate 12 is reduced by $\frac{1}{2}$ and is transmitted to the speed reduction rotary plate 16. The speed reduction ratio can be freely changed by freely changing $R_3$ and $R_1$.

The above description is related to a speed reduction mechanism in accordance with the present invention. A structure in which such a speed reduction mechanism is actually attached to a crankshaft of an internal combustion engine will next be described with reference to FIG. 3.

Figure 3:
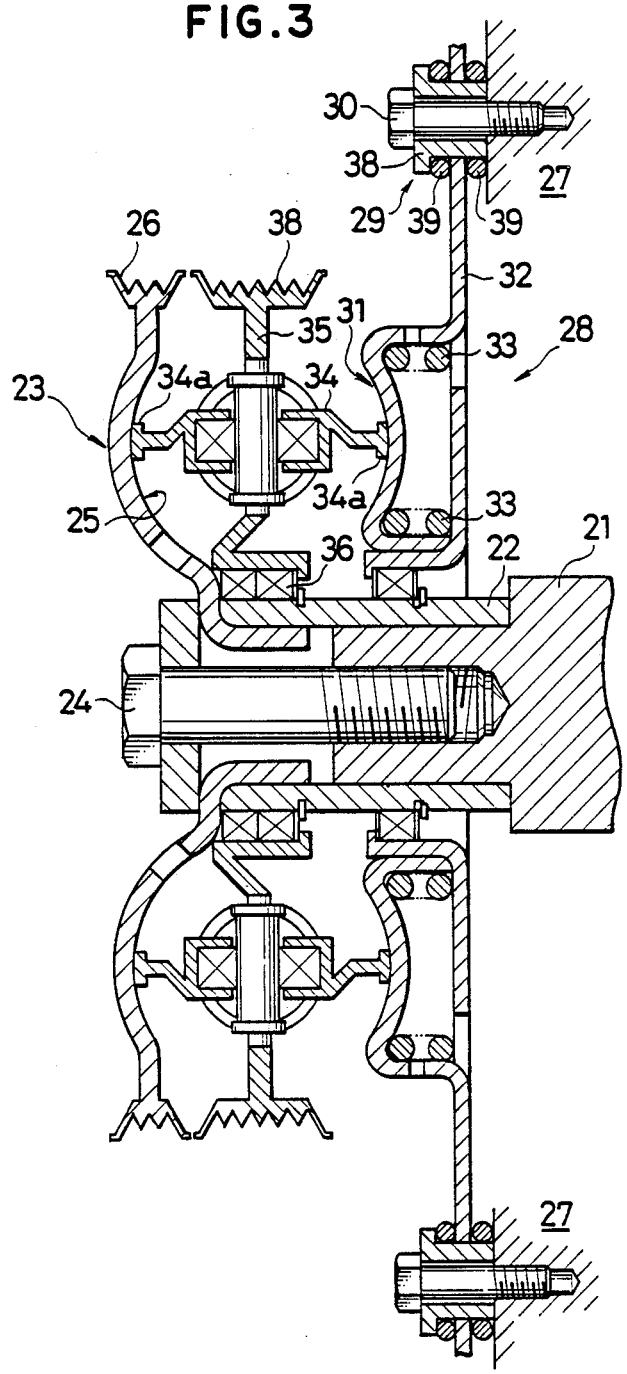
FIG. 3 is a cross-sectional view showing a structure in which the reduction gear is attached to a crankshaft of an internal combustion engine.

In FIG. 3, an outer sleeve 22 is press-fitted into a crankshaft 21 of an internal combustion engine as a drive source. A drive member 23 is pressed by a crank bolt 24 at an end of the outer sleeve 22 and is fixed to the crankshaft 21. The drive member 23 is approximately in the shape of a disc, and a frictional portion 25 approximately having an arc in cross section is annularly formed around the crankshaft 21 on a side of the drive member 23. A pulley groove portion 26 is formed in a peripheral portion of the drive member 23, and the speed reduction of the pulley groove portion 26 is not performed. A fixed member 28 fitted to the crankshaft 21 is fixed by a bolt 30 to a side wall of a cylinder block 27 through an error absorbing member 29 in a position opposite the drive member 23. The fixed member 28 is composed of a frictional portion 31 approximately having an arc in cross section, and a base portion 32, and a compression spring 33 is disposed between the frictional portion 31 and the base portion 32 such that the frictional portion 31 is biased towards the frictional portion 25. The frictional portions 31 and 25 are opposite each other such that these portions form a circular shape by continuously extending and connecting their arc shapes to each other. A rotor 34 is disposed as a frictional wheel approximately in the shape of a disc between the frictional portions 25 and 31. A peripheral portion 34a of the rotor 34 frictionally contacts the frictional portions 25 and 31, and this frictional contact generates a frictional force by the biasing force of the compression spring 33, thereby securing the transmission of the rotary drive force. A speed reduction rotary member 35 is rotatably supported by the outer sleeve 22 through a bearing 36 between the drive member 23 and the fixed member 28. The rotor 34 is rotatably attached to the speed reduction rotary member 35 through a bearing 37. Three rotors 34 are attached to the speed reduction rotary member 35, and are spaced apart from each other by an equal angle in the circumferential direction around the crankshaft 21 as a center. A pulley groove portion 38 is formed in a peripheral portion of the speed reduction rotary member 35, and an unillustrated belt is wound around the pulley groove portion 38, and is wound around an unillustrated pulley attached to an input shaft of an auxiliary apparatus.

On the other hand, the fixed member 28 is arranged in a position in which the fixed member 28 is slightly separated from a side face of the cylinder block 27, which is called a misalignment in the following description. The misalignment is absorbed by the error absorbing member 29, and the fixed member 28 is fixed to the cylinder block 27. The error absorbing member 29 is composed of a cylinder 38 extending through the base portion 32 of the fixed member 28 and having a flange portion, and a pair of O-rings 39 disposed in the outer circumference of the cylinder 38 and pressing the base portion 32 therebetween.

The operation of the apparatus mentioned above will now be described.

The drive member 23 is rotated by the rotary drive force of the crankshaft 21, and the speed of this rotation is reduced by the speed reduction mechanism mentioned above, and is then transmitted to the speed reduction rotary member 35, and is further transmitted to an input shaft of the auxiliary apparatus through a belt. Accordingly, the rotation of the crankshaft 11 at a high speed is reduced and is transmitted to the auxiliary apparatus so that no high heat is generated in frictional elements of the auxiliary apparatus, etc., thereby improving the durability thereof. This speed reduction can be curvedly performed steplessly when the rotor 34 is rotated. Namely, when the number of rotations of the internal combustion engine exceeds a predetermined value at a high speed, the number of transmitted rotations of the auxiliary apparatus can be greatly reduced so as not to rotate the engine excessively.

In addition, since the speed reduction mechanism has a canti-lever structure, the apparatus can be made compact so that the apparatus can be sufficiently disposed even in an engine room having a small space to be utilized. Further, the speed reduction is performed by utilizing the rotor 34 as a frictional wheel, so that, even when the rotary drive force of the crankshaft 21 is slightly changed, this slight change can be absorbed by the frictional contact so as not to be transmitted to the belt, thereby preventing the deterioration of the durability of the belt due to such a slight change.

In the embodiment mentioned above, the speed reduction mechanism is disposed in the crankshaft 21 as a drive shaft, but may be disposed in a driven shaft of an auxiliary apparatus, etc., in which case the operation is the same as the one mentioned in the above embodiment. Further, the speed reduction mechanism is used when the rotational speed of the crankshaft 21 of the internal combustion engine is reduced, but may be used in a place in which it is necessary to dispose the conventional speed reduction mechanism.

As mentioned above, in accordance with the present invention, by using a rotor, the rotational speed of an internal combustion engine as a drive source is reduced and the rotational force thereof is transmitted to a speed reduction rotary member, thereby transmitting the speed reduction rotation to a driven source such as an auxiliary apparatus. Accordingly, no high heat is generated in frictional elements of the auxiliary apparatus, etc., thereby improving the durability thereof.

In addition, the apparatus can be made compact and be sufficiently disposed in a small engine room, etc., and, even when the rotary drive force is slightly changed, this slight change can be absorbed by frictional contact, thereby improving the durability of a belt.

Figure 4A:
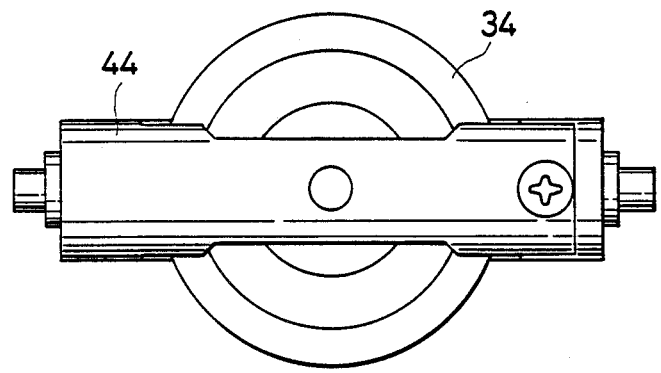
FIGS. 4A and 4B are respectively plan and cross-sectional views of a rotary holder for holding a disc-shaped rotor.
Figure 4B:
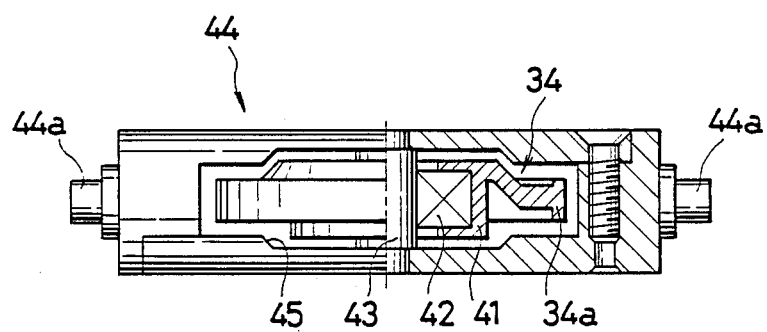

In FIGS. 4A and 4B, the disc-shaped rotor 34 is composed of a disc portion 41 having a peripheral portion 34a frictionally contacting the frictional portions 25 and 31, and a central shaft 43 for rotatably supporting the disc portion 41 through a bearing 42. The central shaft 43 of the disc-shaped rotor 34 is rotatably supported by a rotary holder 44 approximately having a cylindrical shape. Namely, a holding hole 45 for receiving and holding and storing the rotor 34 is formed in an approximately central portion of the rotary holder 44. The upper and lower ends of the central shaft 43 are fixed to the rotary holder 44 perpendicularly to the axis of the rotary holder 44.

As shown in FIG. 5, the rotary holder 44 is disposed in the speed reduction rotary member 35 such that the axis of the rotary holder 44 is perpendicular to the radial direction of the speed reduction rotary member 35. Namely, the rotary holder 44 is stored in a storing elongated hole portion 35a disposed to be perpendicular to the radial direction of the speed reduction rotary member 35. Support shaft portions 44a and 44b integrally formed at both ends of the rotary holder 44 are rotatably held and fixed by a pair of fixing plates 47a and 47b therebetween through bearings 46. The rotary holder 44 for supporting the rotor 34 is disposed around the crankshaft 21 in the speed reduction member 35 by three ones at an equal angle in the circumferential direction, where two of the rotary holders are not illustrated in the figures. The rotary holder 44 is rotated by an unillustrated rotating mechanism, and the disc-shaped rotor 34 is thereby oscillated. Thus, the above-mentioned distances $R_1$ and $R_3$ are freely changed by the oscillating movement of the rotor 34, thereby freely changing the speed reduction ratio $\beta/\alpha$ of the speed reduction mechanism.

Namely, when the internal combustion engine is rotated at a low speed and the rotor 34 is oscillated by the rotating mechanism such that the distance $R_3$ is smaller than the distance $R_1$, the ratio $R_3/R_1$ at $\beta=(1+R_3/R_1)^{-1}\times\alpha$ is reduced so that the reduction ratio $\beta/\beta$ can be reduced. Next, when the internal combustion engine is rotated at a high speed and the rotor 34 is oscillated such that the distance $R_3$ is larger than the distance $R_1$, the ratio $R_3/R_1$ at $\beta=(1+R_3/R_1)^{-1}\times\alpha$ is increased so that the reduction ratio $\beta/\alpha$ can be increased.

Figure 6:
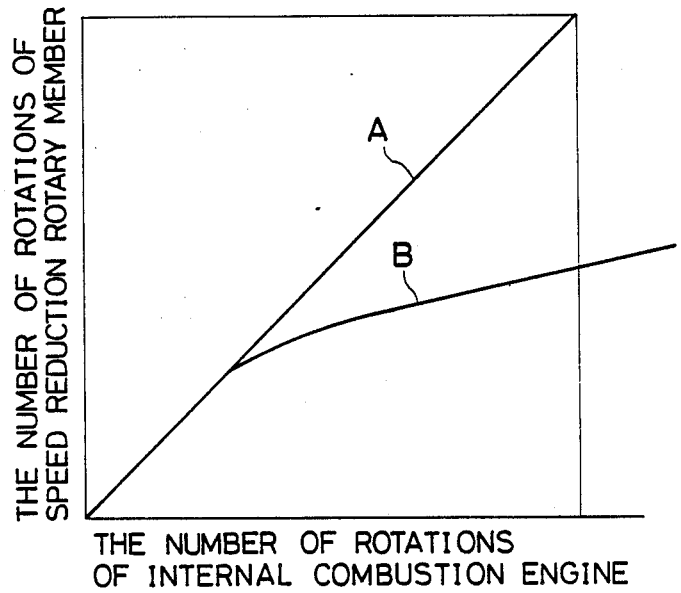
FIG. 6 is a graph showing the speed reduction characteristics of the speed reduction mechanism.

FIG. 6 shows the relation between the number of rotations of the internal combustion engine and the number of rotations of the speed reduction rotary member, which is the speed reduction characteristics when the rotor 34 is oscillated. In FIG. 6, linear line A is related to the case in which the speed reduction mechanism is not disposed. In contrast, in the present invention, when the ratio $R_3/R_1$ is freely changed by oscillating the rotor 34, the number of rotations of the speed reduction rotary member is not greatly reduced as described before when the number of rotations of the internal combustion engine is small, and the number of rotations of the speed reduction rotary member is greatly reduced when the number of rotations of the internal combustion engine is large. Thus, the reduction ratio $\beta/\alpha$ shows the characteristics illustrated by curve B. Accordingly, as the number of rotations of the internal combustion engine becomes large, the speed reduction rotary member is rotated to greatly reduce the number of rotations of the internal combustion engine and the rotational force of the speed reduction rotary member can be transmitted to the auxiliary apparatus, thereby preventing an excessive rotation of the auxiliary apparatus. As a result, no high heat is generated in frictional elements of the auxiliary apparatus, and the auxiliary apparatus is not damaged. Further, even when the internal combustion engine is rotated at a low speed, the speed reduction rotary member can be rotated at a number of rotations larger than a predetermined one and this rotational force can be transmitted to the auxiliary apparatus so that the auxiliary apparatus can be sufficiently functioned.

When various kinds of auxiliary apparatuses such as a compressor for air conditioner, alternator are unnecessarily operated at a high speed, the internal combustion engine loses the horse power thereof due to such an unnecessary high speed operation. However, in the present invention, as mentioned above, the rotational speed of the auxiliary apparatus is variably reduced so as not to excessively rotate the engine, so that the loss of the horse power of the internal combustion engine for rotating the auxiliary apparatus can be reduced. Accordingly, the output of the internal combustion engine can be increased by reducing the lost horse power thereof, and the fuel cost thereof can be reduced.

As mentioned above, in accordance with the present invention, a disc-shaped rotor is oscillated such that, when one of both edges of a disc-shaped rotor in the direction of the rotary central axis of a drive member approaches this rotary central axis, the other of the both edges of the rotor is moved away from the rotary central axis. Accordingly, the rotation of an internal combustion engine can be transmitted to a driven source such as an auxiliary apparatus with the speed reduction changed. Thus, no high heat is generated in frictional elements of the auxiliary apparatus, etc., thereby improving the durability thereof. Further, the fuel cost is reduced since the lost horse power of the internal combustion engine can be reduced. Further, even when the internal combustion engine can be rotated at a low speed, the auxiliary apparatus, etc., can be rotated at a number of rotations larger than a predetermined one, so that the auxiliary apparatus, etc., can be sufficiently functioned.

FIGS. 7A-13 show another embodiments of the present invention. In FIGS. 7A-13, the same reference numerals as those of FIG. 1-6 are the same or corresponding portions as those of FIGS. 1-6.

Figure 7A:
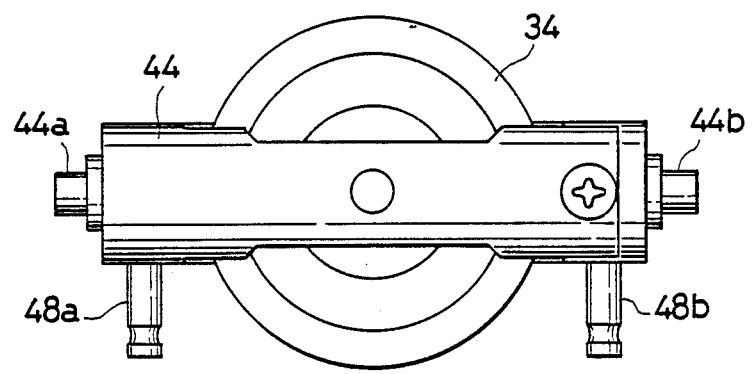
FIG. 7A and 7B are respectively plan and cross-sectional views of the rotary holder for holding the rotor in another embodiment of the present invention.
Figure 7B:
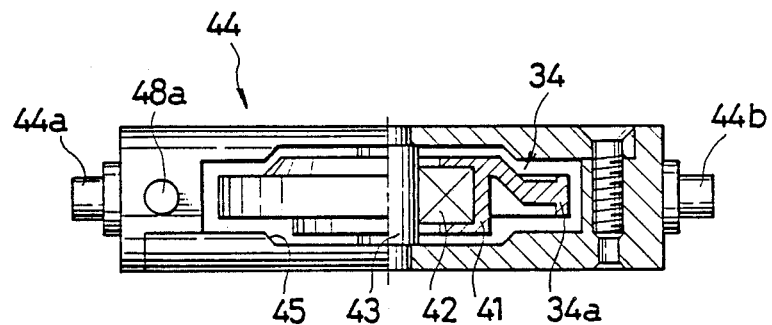
Figure 8:
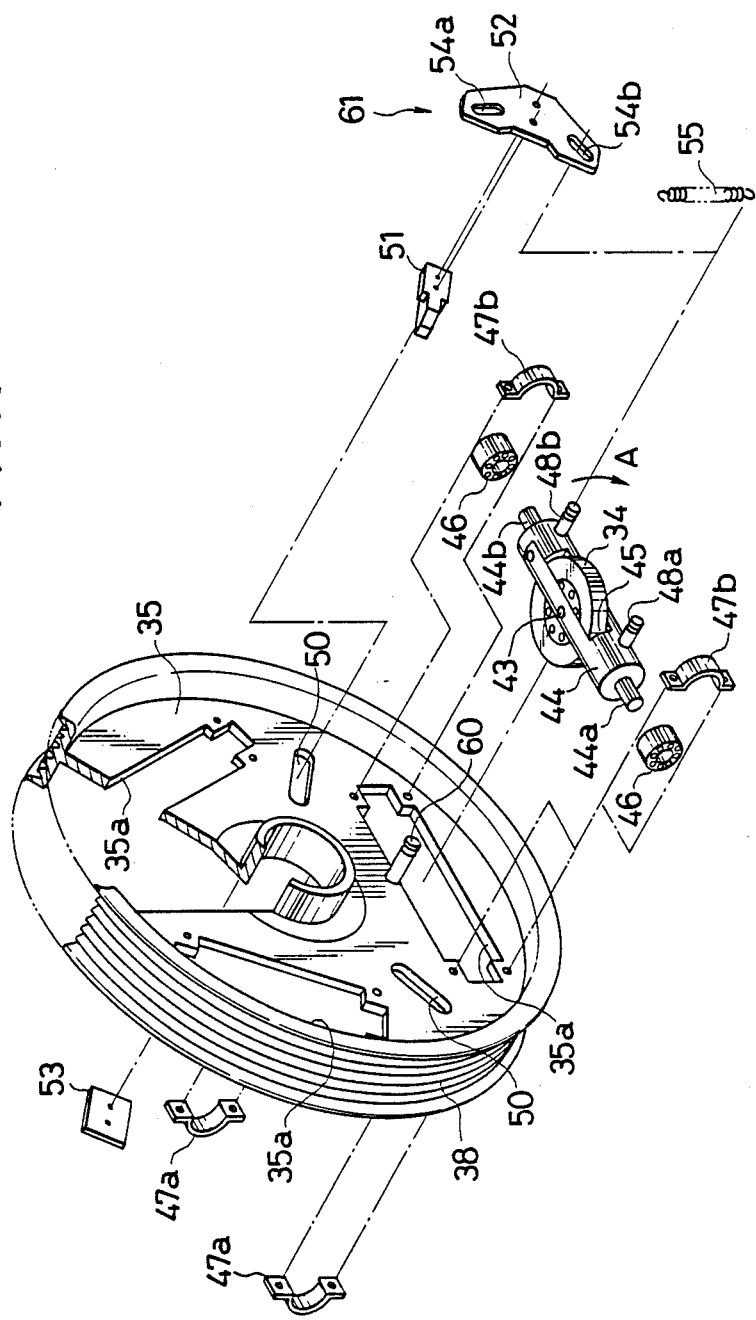
FIG. 8 is an exploded perspective view of the rotary holder of FIGS. 7A and 7B disposed in the speed reduction rotary member.
Figure 9A:
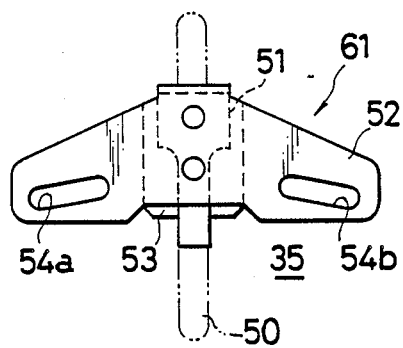
FIGS. 9A and 9B are respectively plan and side views of a cam plate and a centrifugal weight.
Figure 9B:
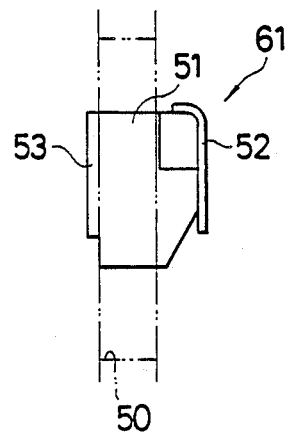
Figure 10:
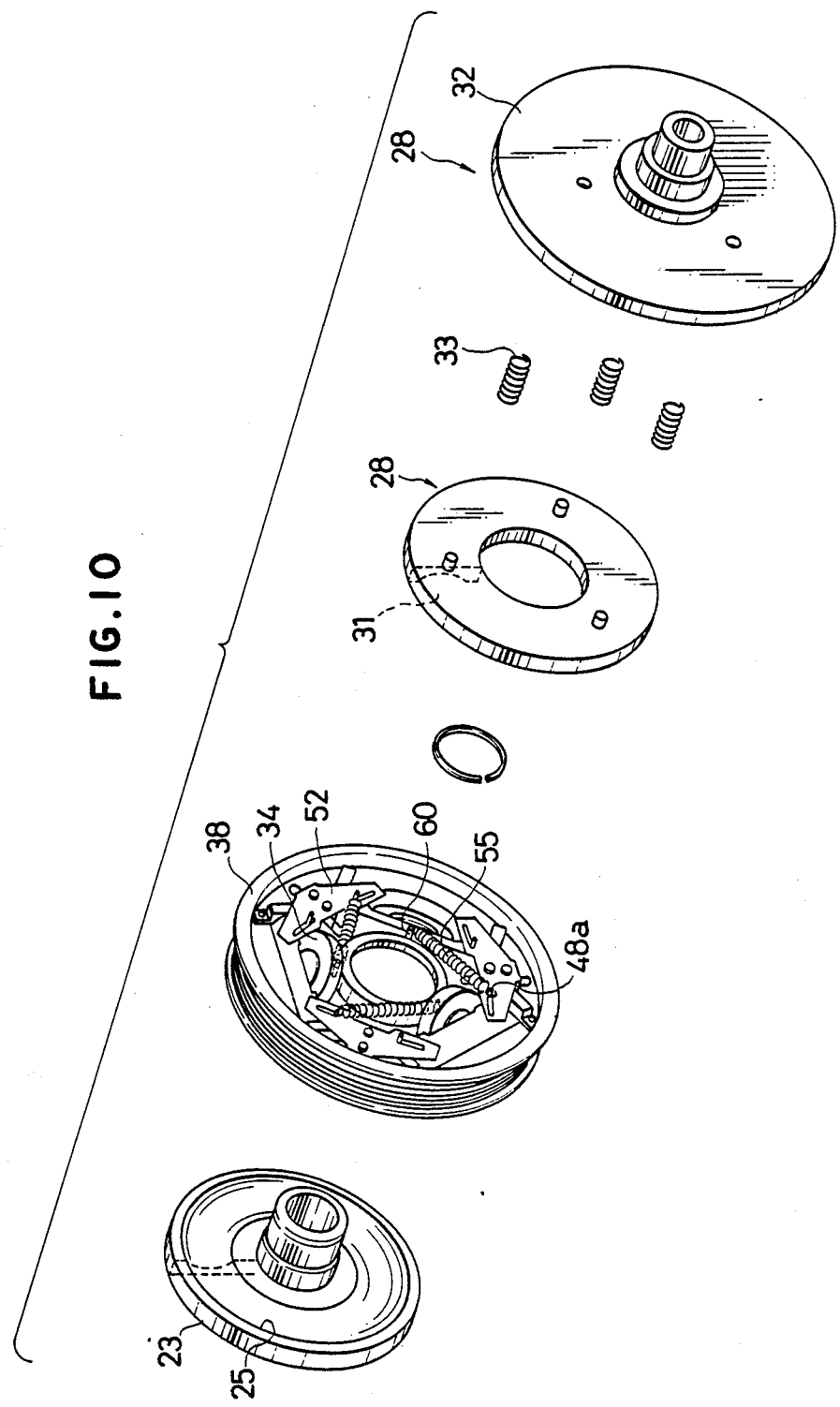
FIG. 10 is an exploded perspective view of the speed reduction mechanism in another embodiment of the present invention.
Figure 11:
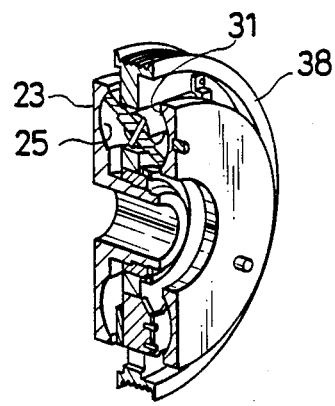
FIGS. 11 and 12 are cross-sectional perspective views respectively showing the attached and detached states of a fixed member of the speed reduction mechanism in another embodiment of the present invention.
Figure 12:
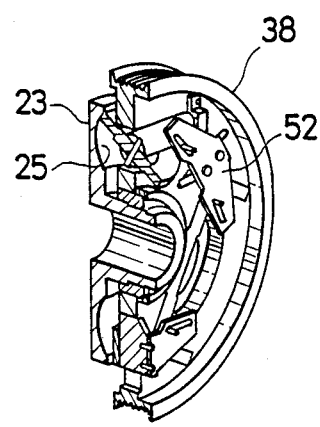

In FIGS. 7A and 7B and 8, a pair of pins 48a and 48b are disposed at both ends of a rotary holder 44. In FIG. 8, three elongated holes 50 are radially disposed in an intermediate portion of a speed reduction rotary member 35 disposing the adjacent rotary holder 44 therein, and are spaced apart from each other at an equal angle around a crankshaft 21. As shown in FIGS. 9A and 9B, a centrifugal weight 51 is slidably fitted into each of the elongated holes 50, and a cam plate 52 approximately in the shape of an isosceles triangle is fixed onto a face of the centrifugal weight 51 on the side of a fixed member 28. A stopping plate 53 is fixed onto a face of the centrifugal weight 51 on the side of a drive member 23. A pair of elongated holes 54a and 54b are disposed on right and left sides of the cam plate 52. The pin 48b of the rotary holder 44 is inserted into the one elongated hole 54b, and an unillustrated pin of adjacent another rotary holder which is not shown is inserted into the other elongated hole 54a. Accordingly, when the speed reduction rotary member 35 is rotated, the centrifugal weight 51 is slid by the centrifugal force thereof towards the outer circumference of the speed reduction rotary member 35 so that the pin 48b is pushed by the cam plate 52 fixed to the centrifugal weight 51 in the outer circumferential direction of the speed reduction rotary member 35.

When the pin 48b is pushed in this outer circumferential direction, the rotary holder 44 is rotated in the outer circumferential direction as shown by arrow A in FIG.

8 since the rotary holder 44 is rotatably disposed in the speed reduction rotary member 35, thereby oscillating the disc-shaped rotor 34. A pin 60 is disposed on a wall surface of the speed reduction rotary member 35 in the inner circumference thereof, and a tension spring 55 is disposed between the pin 60 and the pin 48b of the rotary holder 44, so that the rotary holder 44 is biased at any time in a direction opposite the direction of arrow A. Accordingly, the rotary holder 44 is rotated by the centrifugal weight 51 and the tension spring 55 in the direction of arrow A or the reverse direction thereof, thereby oscillating the disc-shaped rotor 34. Thus, the distances $R_1$ and $R_3$ mentioned above can be freely changed by the oscillation of the rotor 34, so that the speed reduction ratio of the speed reduction mechanism can be freely changed.

The centrifugal weight 51, cam plate 52 and stopping plate 53 constitute an oscillating means 61 as a whole.

When the internal combustion engine is rotated at a low speed, a strong centrifugal force is not applied to the centrifugal weight 51 since the rotational speed of the speed reduction rotary member 35 is reduced and the speed reduction rotary member 35 is rotated at a low speed. Accordingly, the centrifugal weight 51 is slightly slid along the elongated hole 50 towards the outer circumference of the speed reduction rotary member 35 against the biasing force of the tension spring 55. Thus, the disc-shaped rotor 34 is not greatly oscillated in the direction of arrow A so that the distance $R_3$ can be relatively small with respect to the distance $R_1$. As a result, the ratio $R_3/R_1$ at $\beta=(1+R_3/R_1)^{-1} \times \alpha$ can be reduced so that the speed reduction ratio $\beta/\alpha$ can be reduced.

Next, as the internal combustion engine is rotated from the low speed to a high speed, the rotational speed of the speed reduction rotary member 35 is reduced, but the speed reduction rotary member 35 is gradually rotated from the low speed to a high speed, so that a strong centrifugal force is gradually applied to the centrifugal weight 57. Therefore, the centrifugal force 51 is gradually slid along the elongated hole 50 towards the outer circumference of the speed reduction rotary member 35 against the biasing force of the tension spring 55. Accordingly, the disc-shaped rotor 34 is greatly oscillated in the direction of arrow A so that the distance R can be relatively increased with respect to the distance R . As a result, the ratio $R_3/R_1$ at $\beta=(1+R_3/R_1)^{-1} \times \alpha$ is increased so that the speed reduction ratio $\beta/\alpha$ can be increased. Even in this embodiment, the speed reduction characteristics of the speed reduction mechanism of FIG. 6 can be obtained.

Since three centrifugal weights 51 are attached to the speed reduction rotary member 35 disposing therein the three rotary holders 44, the centrifugal force is uniformly applied to the three centrifugal weights 51 by the rotation of the speed reduction rotary member 35. Accordingly, all the three centrifugal weights 51 can be slid along the elongated holes 50 by the same distance. As a result, all the three rotary holders 44 are rotated by the cam plate 52 by the same angle, so that all the three rotors 34 are also oscillated by the same angle. Since the three rotary holders 44 are respectively rotated by the three centrifugal weights 51, the three rotary holders 44 can be synchronously rotated so that the three rotors 34 can be also synchronously oscillated. As a result, the drive member 23 and the three rotors 34 frictionally contacting the fixed member 28 are synchronously oscillated, so that the speed reduction rotary member 35 can be smoothly rotated.

Figure 13:
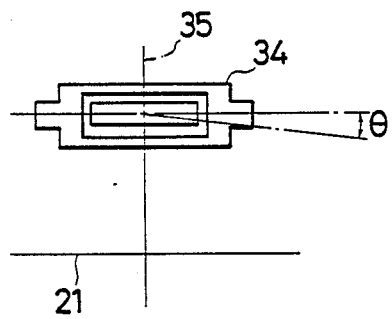
FIG. 13 is a schematic view showing the arrangement of a rotor in a state in which the rotor is rotated in the speed reduction rotary member by a slight angle.

In the above embodiment, the rotor 34 is disposed in the speed reduction rotary member 35 in parallel to the axis of the crankshaft 21, but may be disposed in a state in which the rotor 34 is rotated by a slight angle $\theta$ such as an angle less than 1 degree with respect to the axial direction of the crankshaft, as shown in FIG. 13. In such a case, the rotor 34 starts to be more smoothly oscillated when the speed reduction mechanism is started.

In the above embodiment, the disc-shaped rotor is oscillated by an oscillating means in accordance with the rotational speed of a drive source such as an internal combustion engine so that the rotation of the drive source can be transmitted to a driven source such as an auxiliary apparatus with the speed reduction ratio changed.

Figure 14:
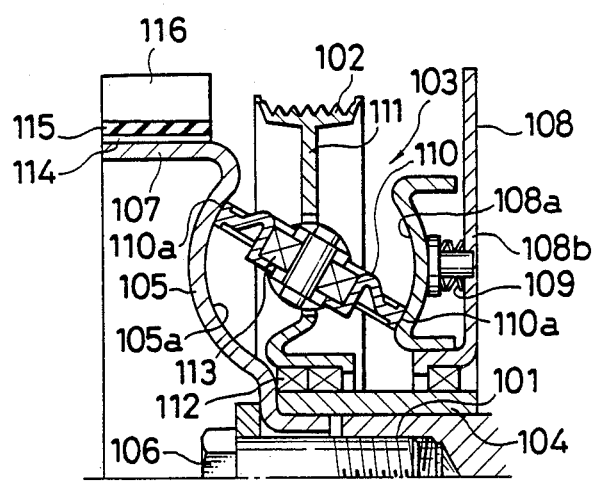
FIGS. 14 to 16 are cross-sectional views showing an auxiliary apparatus of an internal combustion engine in accordance with another embodiments of the present invention.

FIG. 14 shows another embodiment of the present invention.

In FIG. 14, a stepless speed change mechanism 103 is disposed in a power transmission system from a crankshaft 101 of an internal combustion engine to a pulley 102 for driving a stepless speed change auxiliary apparatus. An outer sleeve 104 is press-fitted into the crankshaft 101, and a drive member 105 is pressed by a crank bolt 106 towards an end of the outer sleeve 104, and is fixed to the crankshaft 101. The drive member 105 is generally in the shape of a disc, and a frictional portion 105a approximately having an arc in cross section is annularly formed on a side of the drive member 105 around the crankshaft 101 as a center. A hub portion 107 approximately having a cylindrical shape is formed in a peripheral portion of the drive member 105. A fixed member 108 is fitted into the crankshaft 101, and is fixed to an unillustrated cylinder block in a position opposite the drive member 105. The fixed member 108 is composed of a frictional portion 108a approximately having an arc in cross section and a base portion 108b, and a belleville spring 109 is disposed between the frictional portion 108a and the base portion 108b so that the frictional portion 108a is biased by the belleville spring 109 towards the frictional portion 105a. The frictional portions 105a and 108a are arranged to be opposite each other such that they form a circular shape by extending and connecting their arc shapes to each other. A generally disc-shaped rotor 110 is disposed as a frictional wheel between the frictional portions 105a and 108a. A peripheral portion 110a of the rotor 110 frictionally contacts the frictional portions 105a and 108a. This frictional contact generates a frictional force by the biasing force of the belleville spring 109 thereby securing the transmission of the rotary drive force.

A speed reduction rotary member 111 is rotatably supported by the outer sleeve 104 through a bearing 112 between the drive member 105 and the fixed member 108. The rotor 110 is rotatably attached to the speed reduction rotary member 111 through a bearing 113. The rotor 110 is oscillationally attached to the speed reduction rotary member 111 such that, when one of both edges of the rotor 110 in the direction of the central rotary axis of the crankshaft 101 approaches the crankshaft 101, the other edge of the rotor 110 is moved away from the crankshaft 101. The rotor 110 is oscillated by an oscillating mechanism which is not shown. A pulley 102 for driving a stepless speed change auxiliary apparatus is integrally formed in a peripheral portion of the speed reduction rotary member 111, and an unillustrated belt is wound around the pulley 102, and is also wound around an unillustrated pulley attached to an input shaft of the auxiliary apparatus.

A ring 114 is press-fitted into the outer circumference of the hub portion 107 of the drive member 105, and an elastic member 115 made of natural rubber, synthetic rubber, etc., is disposed on the outer circumference of the press-fitted ring 114. A cylindrical oscillation-restricting mass 116 is fitted onto the outer circumference of the elastic member 115.

The operation of the apparatus in the embodiment mentioned above will next be described.

When the drive member 105 is rotated by the rotary drive force of the crankshaft 101, the rotor 110 is rotated around itself and is simultaneously revoluted around the central axis of the crankshaft 101, since the rotor 110 contacts both the rotating drive member 105 and the resting fixed member 108. The speed reduction rotary member 111 is rotated around the central axis of the crankshaft 101 by the revolution of the rotor 110. At this time, the rotor 110 is oscillated by an oscillating mechanism in accordance with the rotational speed of the crankshaft 101. Accordingly, the rotational speed of the crankshaft 101 is steplessly changed by the stepless speed change mechanism 103, and the rotation of the crankshaft 101 is transmitted from the pulley 102 through a belt to the stepless speed change auxiliary apparatus.

When only a single pulley is attached to the crankshaft 101, the relation between the rotational speed of the internal combustion engine and a tortional angle of the crankshaft will be briefly described. Since the mass of the single pulley is small, the tortional angle of the crankshaft 101 is less than 0.2° until the rotational speed of the internal combustion engine reaches 6000 rpm for example, so that the tortional oscillation is small.

Next, when an auxiliary drive apparatus of the internal combustion engine having a mass much greater than the mass of the single pulley is attached to the crankshaft 101, the tortional angle of the crankshaft 101 exceeds 0.2° at a certain rotational speed of the internal combustion engine, thereby increasing the tortional oscillation. A noise is generated by this greatly tortional oscillation of the crankshaft 101, and the crankshaft 101 might be damaged by the fatigue thereof in some cases. Further, the crank bolt 106 might be untightened by the greatly tortional oscillation of the crankshaft 101.

However, since the oscillation-restricting mass 116 is disposed in the drive member 105 through the elastic member 115, the tortional oscillation of the crankshaft 101 is transmitted to the elastic member 115 and the oscillation-restricting mass 116, thereby greatly oscillating the elastic member 115 and the oscillation-restricting mass 116. Therefore, the tortional angle of the crankshaft 101 is less than 0.2° until the rotational speed of the internal combustion engine reaches 6000 rpm so that the tortional oscillation is reduced. Accordingly, since the tortional oscillation is reduced, the noise can be restricted and the crankshaft 101 is not damaged by the fatigue thereof, and the crankshaft 101 is not untightened.

When it is necessary to operate the auxiliary apparatus without reducing the rotational speed of the crankshaft depending on the function of the engine and the kind of the auxiliary apparatus, a pulley having the function of an oscillation-restricting mass may be used instead of the oscillation-restricting mass, thereby obtaining the function of the pulley having the same rotational speed as the one of the crankshaft and the speed-reduction function of the pulley 102.

Figure 15:
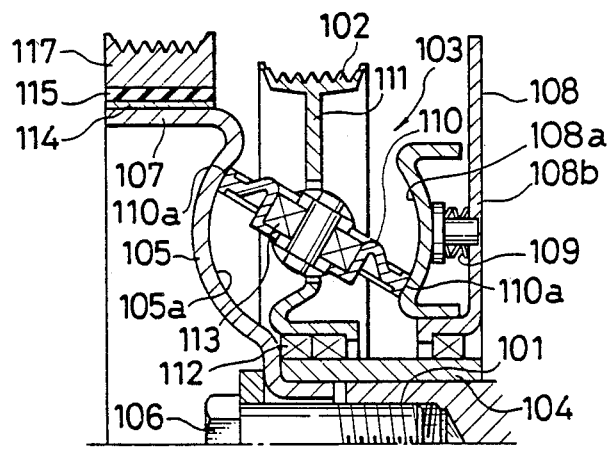
Figure 16:
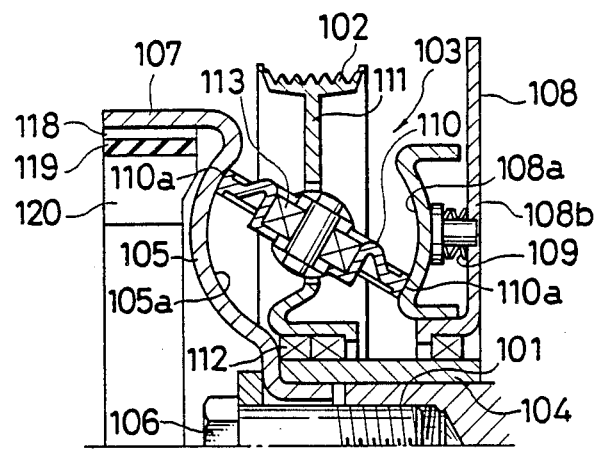

As shown in FIG. 15, a pulley 117 having a corrugated shape in cross section has a function of the oscillation-restricting mass, and is disposed to drive the auxiliary apparatus directly connected to the crankshaft, and is fitted onto the outer circumference of the elastic member 115. In FIG. 16, a ring 118 is press-fitted into the inner circumference of the hub portion 107 of the drive member 105, and an elastic member 119 is disposed in the inner circumference of the press-fitted ring 118, and an oscillation-restricting mass 120 is fitted into the inner circumference of the elastic member 119. Even in the structures shown in FIGS. 15 and 16, the tortional oscillation of the crankshaft 101 can be reduced by the elastic members 115 and 119, the pulley 117 and the oscillation-restricting mass 120 as in the embodiment shown in FIG. 14.

Figure 17:
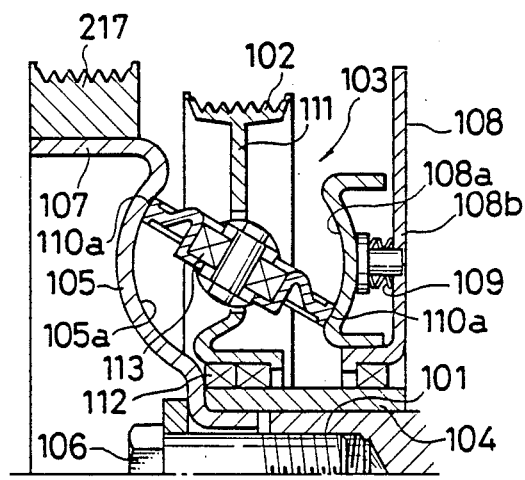
FIG. 17 is a cross-sectional view showing an auxiliary apparatus of an internal combustion engine in accordance with another embodiment of the present invention.

FIG. 17 shows another embodiment of the present invention. In FIG. 17, a pulley 217 directly connected to a crankshaft and driving an auxiliary apparatus is attached to an outer circumference of the hub portion 107 of the drive member 105 mentioned above. In such a structure, the rotational speed of the pulley 217 is not reduced, and the pulley 217 is rotated at the same speed as the one of the crankshaft. Accordingly, such a pulley 217 may be used when it is necessary to operate the auxiliary apparatus without reducing the rotational speed of the crankshaft, depending on the function of the engine and the kind of the auxiliary apparatus.

As mentioned above, in accordance with the present invention, two rotary forces different in nature from each other can be obtained by a single auxiliary drive apparatus. Accordingly, when the auxiliary drive apparatus of the present invention is used as an auxiliary drive apparatus for an automobile such as a power pump, air compressor, or alternator, etc., which does not need to be operated at a speed higher than a redetermined speed, the rotational speed of the auxiliary drive apparatus can be maintained at the predetermined speed even when the number of rotations of the internal combustion engine is increased. Further, the number of rotations of an auxiliary drive apparatus such as a water pump can be increased in accordance with the increase of the number of rotations of the engine since it is important from the view point of the engine cooling to rotate the auxiliary apparatus in proportion to the increase of the number of rotations of the engine.

As a result, the auxiliary drive apparatus can be made compact and the structure thereof can be simplified.

What is claimed is:

1. A speed reduction mechanism comprising:
a drive member rotated by a rotary drive force of a drive source;
a permanently non-rotatably fixed member opposing the drive member;
a rotor disposed between the drive member and the fixed member and contacting the drive member and the fixed member at a variable angle and rotated around itself by the rotation of the drive member and revolved around a rotary central portion of the drive member;
a speed alterable rotary member for rotatably supporting the rotor and rotated around the rotary central portion of the drive member by the revolution of the rotor and said speed alterable rotary member including means for providing auxiliary drive output; and means for altering the relative speed of said speed alterable rotary member and said drive member by altering said angle of said rotor based on a speed of said drive member.

2. The speed reduction mechanism of claim 1 wherein said rotor is supported by a holder located on said speed alterable rotary member, said holder being rotatable about a holder axis of rotation which is perpendicular to an axis of rotation of said rotor;
an arm extending at an angle from said holder; and
wherein said means for altering moves said arm to rotate said holder about said holder axis of rotation to change said angle of said rotor.

3. The speed reduction mechanism of claim 1 wherein said rotor is disposed at an angle less than one degree with respect to the axis of rotation of said drive source.

4. The speed reduction mechanism of claim 1 including means for biasing said permanently fixed member toward said rotor.

5. The speed reduction mechanism of claim 1 wherein said speed alterable rotary member is a circular plate.

6. The speed reduction mechanism of claim 1 wherein said means for altering includes a centrifugal weight movably located on said speed alterable rotary member and connected to move said arm.

7. The speed reduction mechanism of claim 6 wherein said speed alterable rotary member has a slot.

8. The speed reduction mechanism of claim 7 wherein said centrifugal weight is slidably located along said slot.

9. The speed reduction mechanism of claim 8 wherein a spring is attached to said arm and to said centrifugal weight to slidably locate said weight along said slot.

10. The speed reduction of mechanism of claim 9 wherein a cam is located on said weight and is attached to said spring.

11. The speed reduction mechanism of claim 10 wherein said cam is approximately an isosceles triangle.

12. An auxiliary drive apparatus of an internal combustion engine comprising:
a crankshaft having a variable speed;
a stepless speed change mechanism disposed in a power transmission system for transmitting power from said crankshaft of the internal combustion engine to a first pulley for driving the auxiliary drive apparatus, said stepless speed change mechanism steplessly altering the speed of said pulley relative to the speed of said crankshaft based on the speed of said crankshaft; and
mass means for restricting the oscillation of the crankshaft through an elastic member.

13. An auxiliary drive apparatus as claimed in claim 12, wherein said apparatus further comprises a drive member connected to the crankshaft and having a hub portion, and a ring press-fitted to the outer circumference of the hub portion of the drive member, and said elastic member is disposed on the outer circumference of the ring.

14. An auxiliary drive apparatus as claimed in claim 13, wherein said mass means is fitted to the outer circumference of said elastic member.

15. An auxiliary drive apparatus as claimed in claim 14, wherein said elastic member comprises natural rubber or synthetic resin.

16. An auxiliary drive apparatus of an internal combustion engine comprising:
a crankshaft having a variable speed;
a stepless speed change mechanism disposed in a power transmission system for transmitting power from said crankshaft of the internal combustion engine to the first pulley for driving the auxiliary drive apparatus, said stepless speed change mechanism including means for steplessly altering the speed of the first pulley relative to the speed of said crankshaft based on the speed of the crankshaft; and
a second pulley disposed on said crankshaft to rotate at a different speed than said first pulley.

17. An auxiliary drive apparatus as claimed in claim 16, wherein said apparatus further comprises a drive member connected to the crankshaft and having a hub portion, and the second pulley is attached to the outer circumference of the hub portion of the drive member.

18. An auxiliary drive apparatus as claimed in claim 16, wherein said apparatus further comprises a drive member connected to the crankshaft and having a hub portion, and a ring press-fitted to the outer circumference of the hub portion of the drive member, and the second pulley is attached to the outer circumference of the hub portion of the drive member through the ring and an elastic member.

19. A speed reduction mechanism comprising: a drive member rotated by a rotary drive force of a drive source;
a permanently non-rotatably fixed member opposing the drive member;
a rotor disposed between the drive member and the fixed member and contacting the drive member and the fixed member;
a speed alterable rotary member rotated around a rotary control portion of the drive member by revolution of the rotor;
a holder for said rotor, said holder having a fixed axis rotation relative to said speed alterable rotary member;
said rotor having an axis of rotation which is perpendicular to said holder axis of rotation;
a control arm extending from said holder at an angle to the fixed axis of rotation of said holder, said control arm being movable through a variable angle relative to said speed alterable rotary member to rotate said holder about said holder axis of rotation and to alter the position of said axis of rotation of said rotor; and
means for altering the relative speed of said speed alterable rotary member and said drive member by altering the angle of said control arm relative to said speed alterable rotary member based on a speed of said drive member.

20. The speed reduction mechanism of claim 19 wherein said rotor is disposed at an angle less than one degree with respect to the axis of rotation of said drive source.

21. The speed reduction mechanism of claim 19 including means for biasing said fixed member toward said rotor.

22. The speed reduction mechanism of claim 19 wherein said altering means includes a centrifugal weight movably mounted to said speed alterable rotary member and connected to move said arm.

23. The speed reduction mechanism of claim 22 wherein said speed alterable rotary member is a circular plate.

24. The speed reduction mechanism of claim 22 wherein said speed alterable rotary member has a slot.

25. The speed reduction mechanism of claim 24 wherein said centrifugal weight is slidably located along said slot.

26. The speed reduction mechanism of claim 25 wherein a spring is attached to said arm and to said centrifugal weight to slidably locate said weight along said slot.

27. The speed reduction mechanism of claim 26 wherein a cam is located on said weight and is attached to said spring.

28. The speed reduction mechanism of claim 27 wherein said cam is approximately an isosceles triangle.

* * * * *